US011893953B2

(12) United States Patent
Kang

(10) Patent No.: US 11,893,953 B2
(45) Date of Patent: Feb. 6, 2024

(54) HIGH-SPEED DRIVING DISPLAY APPARATUS AND DRIVING METHOD THEREOF

(71) Applicant: LG DISPLAY CO., LTD., Seoul (KR)

(72) Inventor: Jeong Ho Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/828,660

(22) Filed: May 31, 2022

(65) Prior Publication Data

US 2022/0415279 A1 Dec. 29, 2022

(30) Foreign Application Priority Data

Jun. 23, 2021 (KR) ........................ 10-2021-0081480

(51) Int. Cl.
*G09G 3/36* (2006.01)

(52) U.S. Cl.
CPC ......... *G09G 3/3688* (2013.01); *G09G 3/3614* (2013.01); *G09G 2310/08* (2013.01)

(58) Field of Classification Search
CPC ....... G09G 2310/0291; G09G 2310/08; G09G 3/3614
See application file for complete search history.

(56) References Cited

U.S. PATENT DOCUMENTS 11,455,931 B1 * 9/2022 Liu .......................... G09G 3/20
2022/0122542 A1 * 4/2022 Kim ..................... G09G 3/2074

FOREIGN PATENT DOCUMENTS

CN 104517566 A 4/2015
KR 2020-0079738 A 7/2020
TW 201325099 A 6/2013

OTHER PUBLICATIONS

KR20200079738A Driving circuit of the display device Jul. 6, 2020 Juneyoung Kim; Soontaek Oh; Hongsoon Kim (Year: 2020).*
Taiwanese Office Action dated Aug. 1, 2023 issued in Patent Application No. 111119408 w/English Translation (10 pages).

* cited by examiner

*Primary Examiner* — Van N Chow
(74) *Attorney, Agent, or Firm* — POLSINELLI PC

(57) ABSTRACT

A display apparatus includes a display panel including a plurality of pixels, a timing controller configured to generate current control information on the basis of a degree of transition of image data which is to be applied to a corresponding pixel of the plurality of pixels, and a plurality of output buffers configured to output a target data voltage, corresponding to the image data, to data output channels connected to the plurality of pixels, wherein each of the output buffers includes an amplifier output circuit configured to apply a rising current or a falling current, which is previously set for outputting the target data voltage, to an output node connected to one of the data output channels and a slew rate adjustment circuit configured to selectively and further apply an additional rising current or an additional falling current to the output node on the basis of the current control information, for increasing an output slew rate of the target data voltage.

16 Claims, 14 Drawing Sheets

| PWRC | $I_{sum}$ |
|---|---|
| LLL | $I_{ref}$ |
| LLH | $2*I_{ref}$ |
| ⋮ | ⋮ |
| HHL | $7*I_{ref}$ |
| HHH | $8*I_{ref}$ |

FIG. 12
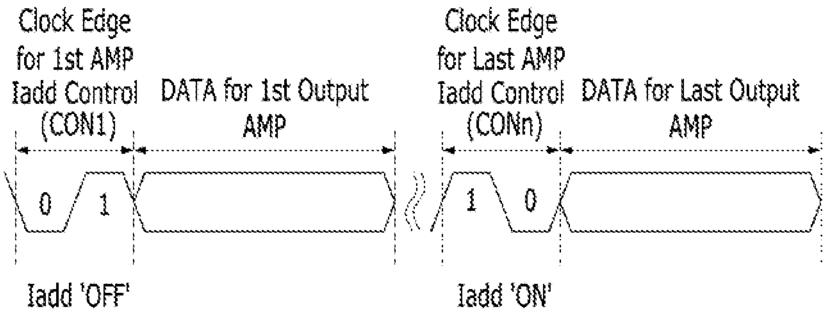
FIG. 13
| Clock Edge | Iadd Status for each AMP |
|---|---|
| 01 | Iadd 'OFF' |
| 10 | Iadd 'ON' |
FIG. 14
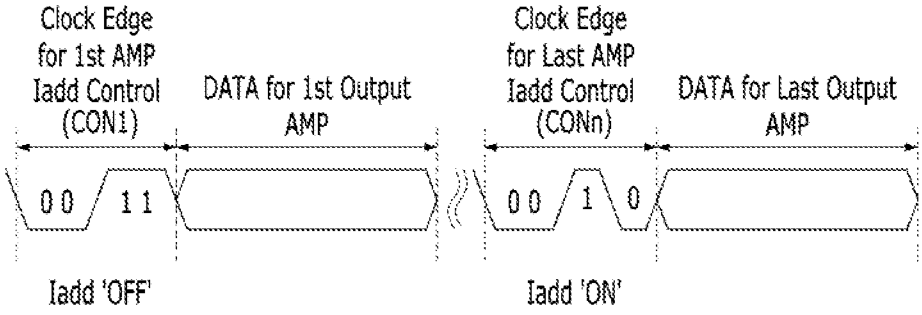

FIG. 15

| Clock Edge | Iadd Status for each AMP |
|---|---|
| 0011 | Iadd 'OFF' |
| 0010 | Iadd 'ON' |

| Polarity (POL) | Clock Edge Status(CES) | | Iadd Status for each AMP |
|---|---|---|---|
| | Delimiter (2Bit) | Delimiter (4Bit) | |
| H | 10 | 0010 | - Odd Output Amp : Iadd-IR On, Iadd-IF Off<br>- Even Output Amp :Iadd-IR Off, Iadd-IF On |
| L | | | - Odd Output Amp : Iadd-IR Off, Iadd-IF On<br>- Even Output Amp : Iadd-IR On, Iadd-IF Off |

FIG. 19

| Polarity (POL) | Clock Edge Status(CES) | | Iadd Status for each AMP |
|---|---|---|---|
| | Delimiter (2Bit) | Delimiter (4Bit) | |
| H | 01 | 0011 | - Odd Output Amp : Iadd-IR Off, Iadd-IF Off<br>- Even Output Amp :Iadd-IR Off, Iadd-IF Off |
| L | | | - Odd Output Amp : Iadd-IR Off, Iadd-IF Off<br>- Even Output Amp : Iadd-IR Off, Iadd-IF Off |

FIG. 20

| PWRC(uA) | Before the invention is applied(us) | After the invention is applied(us) | Delta(us) | Improved Rate(%) |
|---|---|---|---|---|
| LLL(0.5) | 5.97 | 4.18 | 1.79 | 30.0 |
| LLH(0.75) | 4.07 | 3.15 | 0.92 | 22.6 |
| LHL(1.0) | 3.11 | 2.21 | 0.9 | 28.9 |
| LHH(1.5) | 2.15 | 1.67 | 0.48 | 22.3 |
| HLL(2.0) | 1.59 | 1.28 | 0.31 | 19.5 |
| HLH(2.5) | 1.29 | 1.06 | 0.23 | 17.8 |
| HHL(3.0) | 1.1 | 0.92 | 0.18 | 16.4 |
| HHH(4.0) | 0.93 | 0.8 | 0.13 | 14.0 |

HIGH-SPEED DRIVING DISPLAY APPARATUS AND DRIVING METHOD THEREOF

CROSS-REFERENCE TO RELATED APPLICATION

This application claims the priority of Korean Patent Application No. 10-2021-0081480 filed on Jun. 23, 2021, which is hereby incorporated by reference in its entirety.

BACKGROUND

Field of the Disclosure

The present disclosure relates to a high-speed driving display apparatus and a driving method thereof.

Description of the Background

Recently, high-speed driving display apparatuses have been proposed to be suitable for a high resolution and high-speed driving.

A power consumption characteristic and a data charging/discharging characteristic needed for high-speed driving display apparatuses have a trade-off relationship therebetween. In high-speed driving display apparatuses of the related art, it is difficult to satisfy all of a power consumption characteristic and a data charging/discharging characteristic.

SUMMARY

To overcome the aforementioned problem as described above, the present disclosure provides a display apparatus and a driving method thereof, which enhance all of a power consumption characteristic and a data charging/discharging characteristic.

To achieve these and other advantages and in accordance with the purpose of the disclosure, as embodied and broadly described herein, a display apparatus includes a display panel including a plurality of pixels, a timing controller configured to generate current control information on the basis of a degree of transition of image data which is to be applied to a corresponding pixel of the plurality of pixels, and a plurality of output buffers configured to output a target data voltage, corresponding to the image data, to data output channels connected to the plurality of pixels, wherein each of the output buffers includes an amplifier output circuit configured to apply a rising current or a falling current, which is previously set for outputting the target data voltage, to an output node connected to one of the data output channels and a slew rate adjustment circuit configured to selectively and further apply an additional rising current or an additional falling current to the output node on the basis of the current control information, for increasing an output slew rate of the target data voltage.

In another aspect of the present disclosure, a driving method of a display apparatus includes generating current control information on the basis of a degree of transition of image data which is to be applied to pixels and outputting a target data voltage, corresponding to the image data, to data output channels connected to the pixels, wherein the outputting of the target data voltage includes applying a rising current or a falling current, which is previously set for outputting the target data voltage, to an output node connected to one of the data output channels and selectively and further applying an additional rising current or an additional falling current to the output node on the basis of the current control information, for increasing an output slew rate of the target data voltage.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings:

FIG. 12 is a diagram illustrating a first embedded panel interface (EPI) transfer data format including in current control information;

FIG. 13 is a diagram illustrating an on or off status of an additional current based on clock edge information included in the current control information of FIG. 12;

FIG. 14 is a diagram illustrating a second EPI transfer data format including current control information;

FIG. 15 is a diagram illustrating an on or off status of an additional current based on clock edge information included in the current control information of FIG. 14;

FIG. 19 is a diagram illustrating an on or off status of an additional current of each output channel based on a logic value of a vertical polarity control signal when clock edge information is second clock edge information; and FIGS. 20 and 21 are diagrams illustrating a transition time decrease rate before and after the disclosure is applied, in each of a plurality of power control modes.

DETAILED DESCRIPTION

Figure 1:
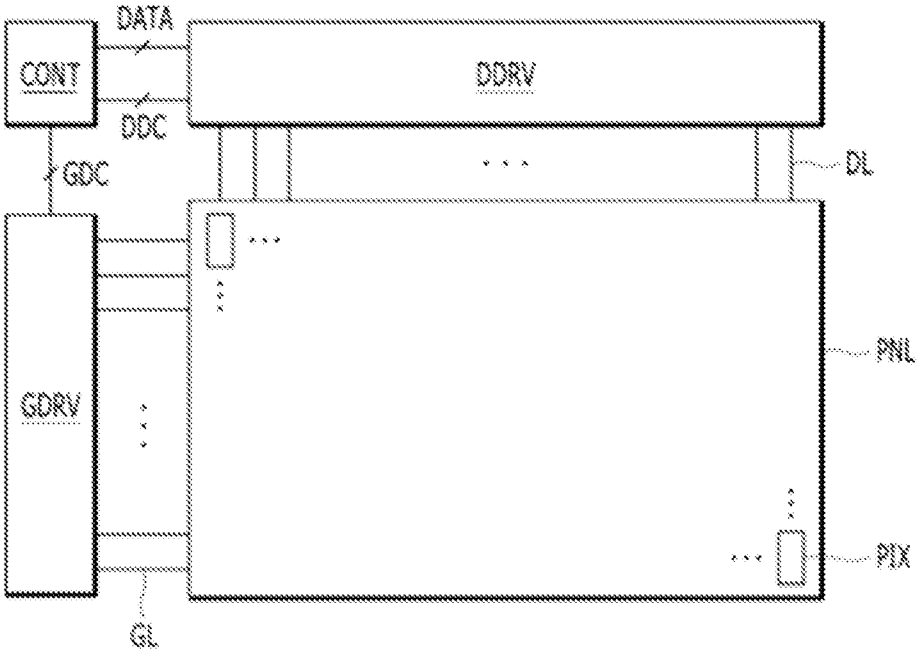
FIG. 1 is a diagram illustrating a display apparatus according to an aspect of the present disclosure.

Hereinafter, the present disclosure will be described more fully with reference to the accompanying drawings, in which exemplary aspects of the disclosure are shown. The disclosure may, however, be embodied in many different forms and should not be construed as being limited to the aspects set forth herein; rather, these aspects are provided so that this disclosure will be thorough and complete, and will fully convey the concept of the disclosure to those skilled in the art.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various aspects of the present disclosure to describe aspects of the present disclosure are merely exemplary and the present disclosure is not limited thereto. Like reference numerals refer to like elements throughout. Throughout this specification, the same elements are denoted by the same reference numerals. As used herein, the terms “comprise”, “having,” “including” and the like suggest that other parts can be added unless the term “only” is used. As used herein, the singular forms “a”, “an”, and “the” are intended to include the plural forms as well, unless context clearly indicates otherwise.

Elements in various aspects of the present disclosure are to be interpreted as including margins of error even without explicit statements.

In describing a position relationship, for example, when a position relation between two parts is described as “on~”, “over~”, “under~”, and “next~”, one or more other parts may be disposed between the two parts unless “just” or “direct” is used.

It will be understood that, although the terms “first”, “second”, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, aspects of the present disclosure will be described in detail with reference to the accompanying drawings.

Figure 2:
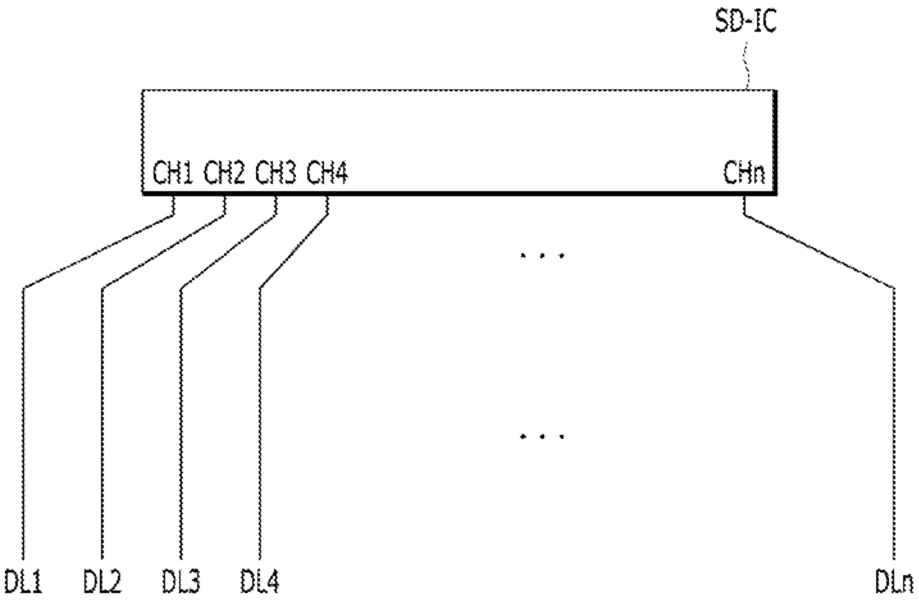
FIG. 2 is a diagram illustrating a connection relationship between a source driver integrated circuit (IC) and data lines in a display apparatus according to an aspect of the present disclosure.

FIG. 1 is a diagram illustrating a display apparatus according to an aspect of the present disclosure. FIG. 2 is a diagram illustrating a connection relationship between a source driver integrated circuit (IC) and data lines in a display apparatus according to an aspect of the present disclosure.

Referring to FIGS. 1 and 2, the display apparatus according to an aspect of the present disclosure may be implemented as an electroluminescent display apparatus or a liquid crystal display apparatus, which includes a display panel PNL, a timing controller CONT, a data driving circuit DDRV, and a gate driving circuit GDRV.

A plurality of data lines DL and a plurality of gate lines GL may be provided in the display panel PNL, and a plurality of pixels PIX may be respectively arranged in a plurality of intersection areas between the signal lines GL and DL. A pixel array may be provided in a display area of the display panel PNL by using the pixels PIX arranged as a matrix type.

In the pixel array, the pixels PIX may configure a horizontal line in a horizontal direction so as to be adjacent. The number of horizontal lines may be a vertical resolution of the display panel PNL. Pixels PIX configuring the same horizontal line may be connected to the same gate line GL and different data lines DL. Each of the pixels PIX may be implemented as an emission cell including a light emitting diode or a liquid crystal cell including a liquid crystal layer.

The timing controller CONT may generate a data timing control signal DDC for controlling an operation timing of the data driving circuit DDRV and a gate timing control signal GDC for controlling an operation timing of the gate driving circuit GDRV, on the basis of timing signals such as a vertical synchronization signal Vsync, a horizontal synchronization signal Hsync, and a data enable signal DE input from a host system. The gate timing control signal GDC may include a gate start signal and gate shift clocks. The data timing control signal DDC may include a source start pulse, a source sampling clock, and a source output enable signal.

The timing controller CONT may transfer image data DATA, input from the host system, to the data driving circuit DDRV through an internal interface circuit. The image data DATA may be for displaying an image by using the pixels PIX, and the data driving circuit DDRV may convert the image data DATA into data voltages and may supply the data voltages to the pixels PIX. The internal interface circuit may be an embedded panel interface (EPI) circuit.

The timing controller CONT may compare the image data DATA by horizontal line units to calculate the degree of transition of the image data DATA by pixel units, and then, may generate current control information on the basis of the degree of transition of the image data DATA. The timing controller CONT may configure the data timing control signal DDC, the current control information, and the image data DATA in an EPI transfer format and may transfer the configured timing control signal DDC, current control information, and image data DATA to the data driving circuit DDRV.

The gate driving circuit GDRV may generate a scan signal SCAN on the basis of the gate timing control signal GDC from the timing controller CONT and may supply the scan signal SCAN to the gate lines GL. A horizontal line to which a data voltage is to be applied may be selected by the scan signal SCAN. The gate driving circuit GDRV may be embedded into a non-display area of the display panel PNL on the basis of a gate-in panel (GIP) type. The non-display area may be disposed outside the panel array in the display panel PNL.

The data driving circuit DDRV may include at least one source driver integrated circuit (IC) SD-IC. The source driver IC SD-IC may separate the data timing control signal DDC, the current control information, and the image data DATA from the EPI transfer format transferred from the timing controller CONT. The source driver IC SD-IC may convert the image data DATA into data voltages on the basis of the data timing control signal DDC and may supply the data voltages to the data lines DL1 to DLm through data output channels CH1 to CHm. At this time, the source driver IC SD-IC may selectively and additionally control an output slew rate of each of the data voltages on the basis of the current control information in the data output channels CH1 to CHm, thereby enhancing all of a power consumption characteristic and a data charging/discharging characteristic.

Figure 3:
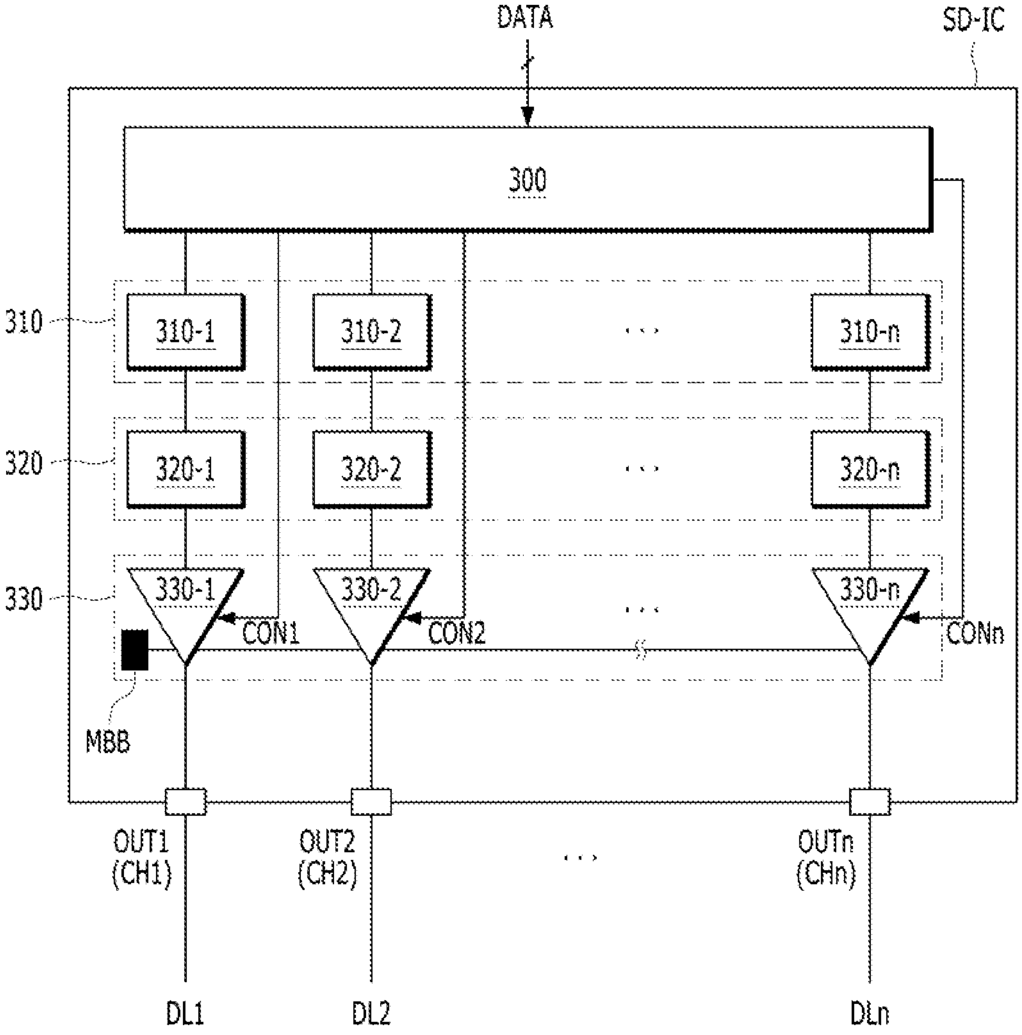
FIG. 3 is a diagram illustrating a source driver IC in a display apparatus according to an aspect of the present disclosure.

FIG. 3 is a diagram illustrating a source driver IC SD-IC in a display apparatus according to an aspect of the present disclosure.

Referring to FIG. 3, the source driver IC SD-IC may include a control logic 300, a latch circuit 310, a digital-to-analog (D/A) conversion circuit 320, and an output circuit 330.

The control logic circuit 300 may sample a bit of control data from a signal received through the EPI transfer format on the basis of an internal clock timing and may recover the data timing control signal DDC for controlling an operation of the source driver IC SD-IC from the sampled control data.

The control logic circuit 300 may sample image data from a signal received through a serial-type EPI transfer format on the basis of the internal clock timing. The control logic circuit 300 may sample and recover pieces of current control information CON1 to CONn from the signal received through the EPI transfer format on the basis of the internal clock timing. The pieces of current control information CON1 to CONn may be independently set and recovered for each data output channel. The pieces of current control information CON1 to CONn may include first clock edge information for enabling an additional current in the output circuit 330 and second clock edge information for disabling an additional current in the output circuit 330.

In an electroluminescent display apparatus, the pieces of current control information CON1 to CONn may further include transition direction information. The transition direction information may be a criterion for selecting a target, which is to be enabled, from among a rising current and a falling current in the output circuit 300 fundamentally. Also, the transition direction information may be further considered in a case which an additional current is enabled in the output circuit 330 (i.e., correspond to the first clock edge information), the transition direction information may be a criterion for selecting a target, which is to be enabled, from among an additional rising current and an additional falling current. The transition direction information may include first status information indicating upward transition and second status information indicating downward transition. When the rising current is enabled based on the first status information in the output circuit 330, upward transition of a data voltage may be performed, and when the additional rising current is enabled based on the first clock edge information and the first status information, an upward transition time of the data voltage may be reduced. When the falling current is enabled based on the second status information in the output circuit 330, downward transition of the data voltage may be performed, and when the additional falling current is enabled based on the first clock edge information and the second status information, a downward transition time of the data voltage may be reduced. Also, when the second clock edge information is input, all of the additional rising current and the additional falling current may be disabled regardless of the transition direction information.

In a liquid crystal display apparatus, the pieces of current control information CON1 to CONn may further include a vertical polarity control signal. A polarity of a data voltage may be inverted by the vertical polarity control signal by horizontal line units. When the data voltage is higher than a common voltage, a polarity of the data voltage may be a positive polarity, and when the data voltage is lower than the common voltage, a polarity of the data voltage may be a negative polarity. The vertical polarity control signal may be a criterion for selecting a target, which is to be enabled, from among the rising current and the falling current in the output circuit 300 fundamentally. Also, the vertical polarity control signal may be further considered in a case which the additional current is enabled in the output circuit 330 (i.e., correspond to the first clock edge information), the vertical polarity control signal may be a criterion for selecting a target, which is to be enabled, from among the additional rising current and the additional falling current. The vertical polarity control signal may include a first logic value indicating upward transition and a second logic value indicating downward transition. When the rising current is enabled based on the first logic value in the output circuit 330, upward transition of a data voltage may be performed, and when the additional rising current is enabled based on the first clock edge information and the first logic value, an upward transition time of the data voltage may be reduced. When the falling current is enabled based on the second logic value in the output circuit 330, downward transition of the data voltage may be performed, and when the additional falling current is enabled based on the first clock edge information and the second logic value, a downward transition time of the data voltage may be reduced. Also, when the second clock edge information is input, all of the additional rising current and the additional falling current may be disabled regardless of the vertical polarity control signal.

The latch circuit 310 may convert bits of image data, sampled by the control logic circuit 300, into a parallel-type data format. The latch circuit 310 may be synchronized based on an internal clock output from the control logic circuit 300.

The D/A conversion circuit 320 may convert image data, converted into the parallel-type data format, into a gamma compensation voltage to generate a data voltage.

The output circuit 330 may include a plurality of output buffers 330-1 to **330-*n* and may output a target data voltage, corresponding to image data, to the data output channels CH1 to CHn. The output circuit 330 may further include a main bias circuit MBB which is connected to the output buffers 330-1 to 330-*n* in common. An output slew rate of each of the output buffers 330-1 to 330-*n* may be controlled based on the pieces of current control information CON1 to CONn individually input from the control logic circuit 300**.

Figure 4:
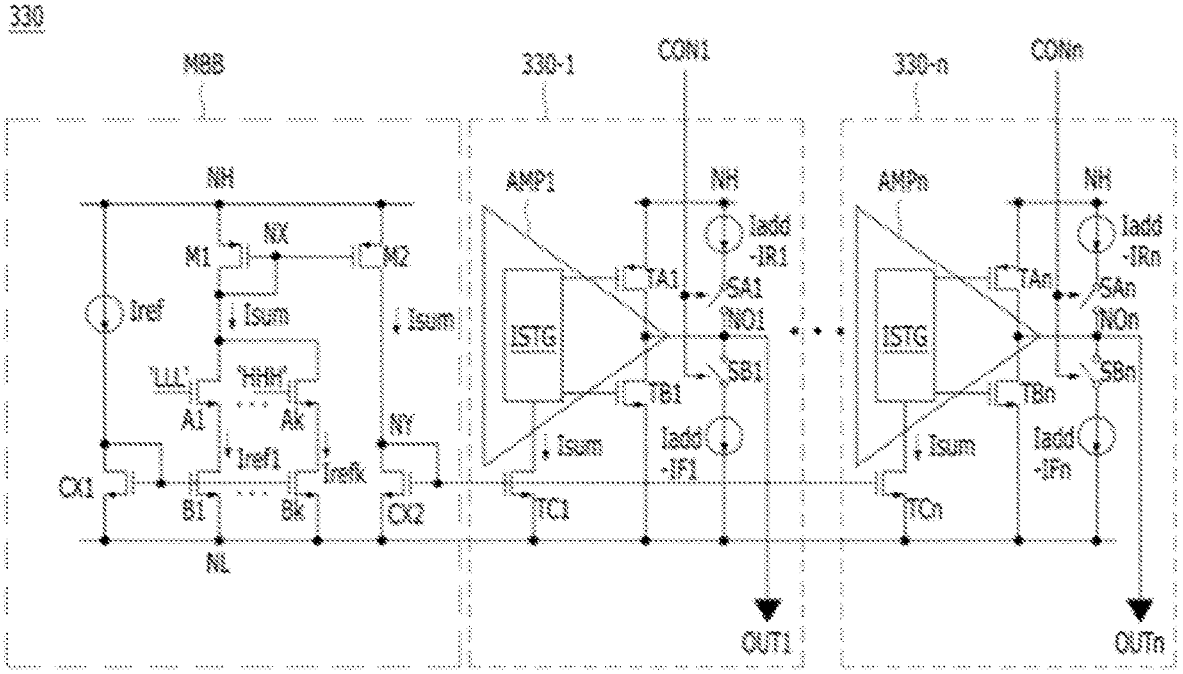
FIG. 4 is a diagram illustrating an output circuit included in a source driver IC in a display apparatus according to an aspect of the present disclosure.
Figures 5, 6:
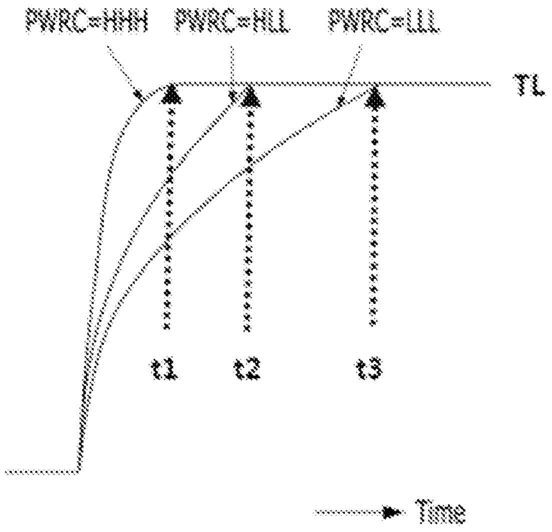
FIG. 5 is a diagram illustrating a relationship between a power control signal and an amplifier bias current in a main bias circuit included in the output circuit of FIG. 4.
FIG. 6 is a diagram illustrating a relationship between an amplifier bias current and a transition time.
Figure 7:
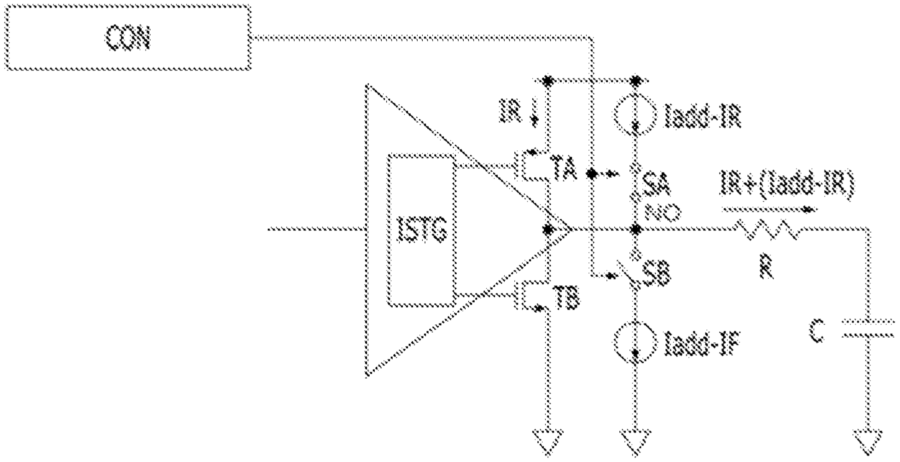
FIGS. 7 and 8 are diagrams for describing an example where an output slew rate of a target data voltage increases with an additional rising current based on current control information (clock edge information+transition direction information)
Figure 8:
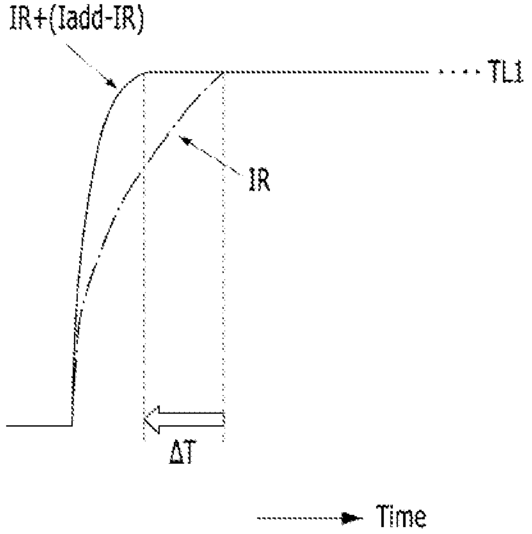
Figure 9:
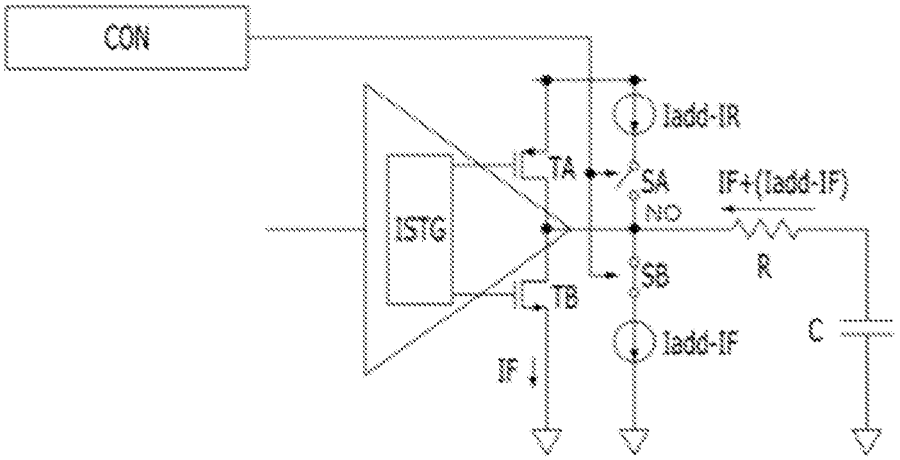
FIGS. 9 and 10 are diagrams for describing an example where an output slew rate of a target data voltage increases with an additional falling current based on current control information (clock edge information+transition direction information)
Figure 10:
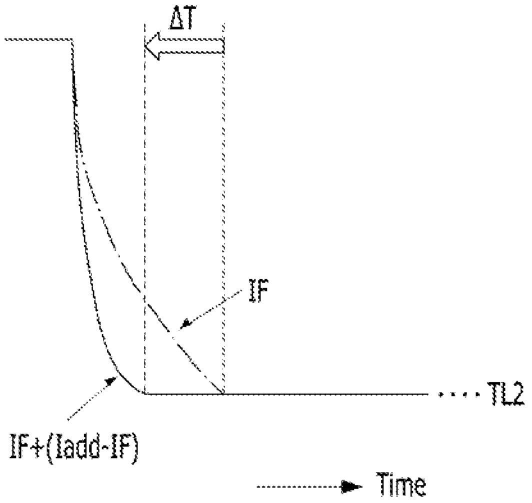

FIG. 4 is a diagram illustrating an output circuit included in a source driver IC in a display apparatus according to an aspect of the present disclosure. FIG. 5 is a diagram illustrating a relationship between a power control signal and an amplifier bias current in a main bias circuit included in the output circuit of FIG. 4. FIG. 6 is a diagram illustrating a relationship between an amplifier bias current and a transition time. FIGS. 7 and 8 are diagrams for describing an example where an output slew rate of a target data voltage increases with an additional rising current based on current control information (clock edge information+transition direction information). FIGS. 9 and 10 are diagrams for describing an example where an output slew rate of a target data voltage increases with an additional falling current based on current control information (clock edge information+transition direction information).

Referring to FIG. 4, an output circuit 330 may include a plurality of output buffers 330-1 to **330-*n*** which are connected to a main bias circuit MBB in common.

The main bias circuit MBB may determine a level of an amplifier bias current Isum on the basis of predetermined power control signals LLL to HHH and may apply the amplifier bias current Isum to the output buffers 330-1 to **330-*n***.

The main bias circuit MBB may include a reference current source, which is connected between a high level voltage source NH and a low level voltage source NL to generate a reference current Iref, and a bias circuit which outputs the amplifier bias current Isum based on the reference current Iref. The bias circuit may include a plurality of mirror units M1 and M2 which mirror the reference current Iref and a current adjustment circuit which determines a level of the bias current Isum on the basis of a power control signal PWRC. Channel capacities of a plurality of transistors (for example, first to nth transistors) A1 to Ak configuring the current adjustment circuit may differ, and for example, a channel capacity of the first transistor A1 may be greater than that of the kth transistor Ak.

The power control signal PWRC may be configured with, for example, eight control signals LLL to HHH as in FIG. 5. The eight control signals LLL to HHH may respectively correspond to eight power control modes and may turn on one of the transistors A1 to A8. In a first power control mode, the first transistor A1 may be turned on based on the control signal LLL, and the amplifier bias current Isum may be the reference current Iref. In a fifth power control mode, the fifth transistor A5 may be turned on based on the control signal HLL, and the amplifier bias current Isum may be 5*reference current Iref. Likewise, in an eighth power control mode, the eighth transistor A8 may be turned on based on the control signal HHH, and the amplifier bias current Isum may be 8*reference current Iref.

The power control signal PWRC, as in FIG. 6, may determine a transition time at which amplifier outputs of the output buffers 330-1 to **330-*n* are shifted to a target voltage level TL. As the amplifier bias current Isum increases, the transition time may be shortened. For example, the transition time may be t1 in the control signal HHH, may be t2 (t2>t1) in the control signal HLL, and may be t3 (t3>t2**) in the control signal LLL.

Each of the output buffers 330-1 to **300-*n* may include an amplifier AMP, which includes an input stage ISTG and a plurality of amplifier output circuits TA and TB, and a plurality of slew rate adjustment circuits (a rising current source, a falling current source, SA, and SB) which generate an additional rising current Iadd-IR and an additional falling current Iadd-IF. Here, TA may be one of TA1 to TAn, TB may be one of TB1 to TBn, and AMP may be one of AMP1~AMPn. Also, Iadd-IR may be one of Iadd-IR1 to Iadd-IRn, Iadd-IF may be one of Iadd-IF1 to Iadd-IFn, SA may be one of SA1 to SAn, and SB may be one of SB1** to SBn.

The input stage ISTG may sink the bias current Isum. The input stage ISTG may be implemented with a single ended differential amplifier, but is not limited thereto. The amplifier output circuits TA and TB may apply a rising current or a falling current, corresponding to the bias current Isum, to an output node NO connected to one of data output channels CH1 to CHn on the basis of transition direction information or a vertical polarity control signal. Here, NO may be one of NO1 to NOn.

The amplifier output circuits TA and TB may include a pull-up transistor TA for sourcing a rising current from the high level voltage source NH to the output node NO and a pull-down transistor TB for sinking a falling current from the output node NO to the low level voltage source NL.

The pull-up transistor TA may be turned on for upward transition of a data voltage and may source the rising current to the output node NO, and the pull-down transistor TB may be turned on for upward transition of the data voltage and may sink the falling current to the low level voltage source NL.

The slew rate adjustment circuit may receive current control information CON from the control logic circuit 300. Here, CON may be one of CON1 to CONn. The slew rate adjustment circuit may selectively and further apply the additional rising current Iadd-IR or the additional falling current Iadd-IF to the output node NO on the basis of the current control information CON, thereby increasing an output slew rate of a target data voltage.

The slew rate adjustment circuit may include a first additional current source which generates the additional rising current Iadd-IR, a first additional switch SA which is turned on/off based on the current control information CON and controls a current flow between the first additional current source and the output node NO, a second additional current source which generates the additional falling current Iadd-IF, and a second additional switch SB which is turned on/off based on the current control information CON and controls a current flow between the second additional current source and the output node NO.

The first additional switch SA and the second additional switch SB may be selectively turned on based on the current control information CON, or may be simultaneously turned off. However, the first additional switch SA and the second additional switch SB may not be simultaneously turned on based on the current control information CON.

As in FIG. 7, while the first additional switch SA is being turned on, the first additional current source and the first additional switch SA may be connected serially between the high level voltage source NH and the output node NO. At this time, the first additional current source and the pull-up transistor TA may be connected in parallel between the high level voltage source NH and the output node NO, and thus, a total rising current "IR+(Iadd-IR)" which is a sum of the rising current IR based on the pull-up transistor TA and the additional rising current Iadd-IR based on the first additional current source may be applied to the output node NO. In the total rising current "IR+(Iadd-IR)", as in FIG. 8, a transition time for which an amplifier output is shifted to a first target voltage level TL1 may more decrease by ΔT than the rising current IR, and thus, an output slew rate of a data voltage may be enhanced.

As in FIG. 9, while the second additional switch SB is being turned on, the second additional current source and the second additional switch SB may be connected serially between the low level voltage source NL and the output node NO. At this time, the second additional current source and the pull-down transistor TB may be connected in parallel between the low level voltage source NL and the output node NO, and thus, a total falling current "IF+(Iadd-IF)" which is a sum of the falling current IF based on the pull-down transistor TB and the additional falling current Iadd-IF based on the second additional current source may be applied to the output node NO. In the total falling current "IF+(Iadd-IF)", as in FIG. 10, a transition time for which the amplifier output is shifted to a second target voltage level TL2 may more decrease by ΔT than the falling current IF, and thus, an output slew rate of a data voltage may be enhanced.

As described above, in the present aspect, an amplifier bias current Isum may be set based on a normal transition condition instead of a worst transition condition, and an additional current source may be selectively enabled for only an output channel which satisfies the worst transition condition, thereby enhancing all of a power consumption characteristic and a data charging/discharging characteristic.

Figure 11:
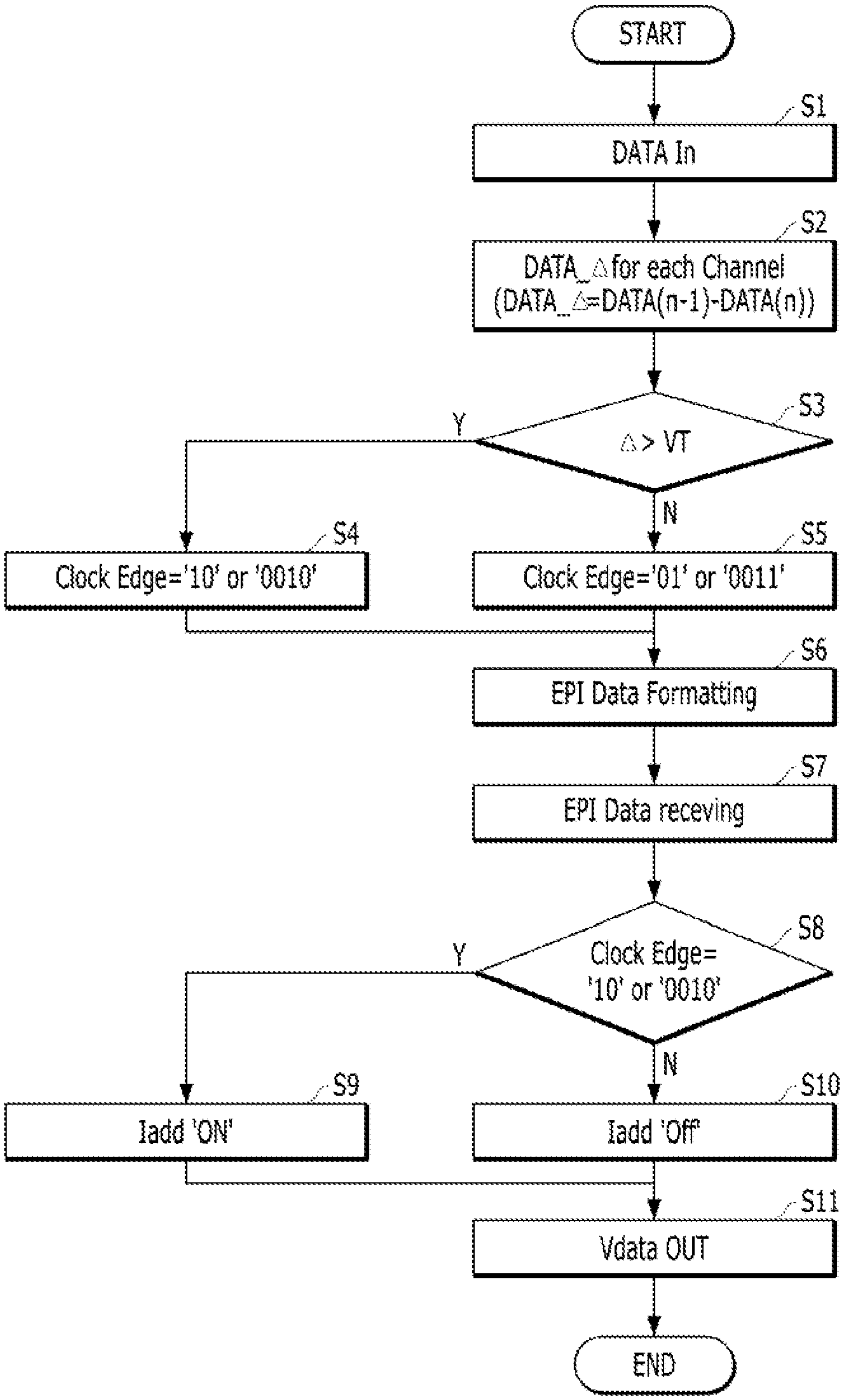
FIG. 11 is a diagram illustrating an operation of a timing controller generating current control information on the basis of the degree of transition of image data and an operation of an output circuit selectively increasing an output slew rate of a target data voltage on the basis of current control information.
Figure 16:
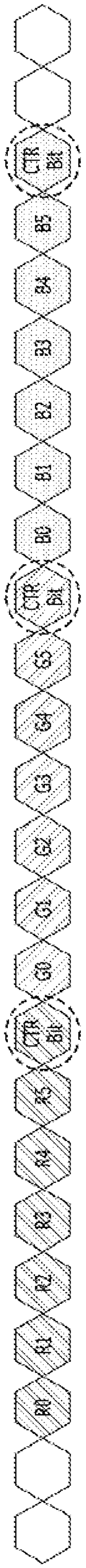
FIG. 16 is a diagram illustrating a third EPI transfer data format including current control information.

FIG. 11 is a diagram illustrating an operation of a timing controller generating current control information on the basis of the degree of transition of image data and an operation of an output circuit selectively increasing an output slew rate of a target data voltage on the basis of current control information. FIG. 12 is a diagram illustrating a first EPI transfer data format including in current control information. FIG. 13 is a diagram illustrating an on or off status of an additional current based on clock edge information included in the current control information of FIG. 12. FIG. 14 is a diagram illustrating a second EPI transfer data format including current control information. FIG. 15 is a diagram illustrating an on or off status of an additional current based on clock edge information included in the current control information of FIG. 14. FIG. 16 is a diagram illustrating a third EPI transfer data format including current control information.

Referring to FIG. 11, in an electroluminescent display apparatus, a timing controller may compare $(N-1)^{th}$ (N being a natural number) line image data with Nth line image data by data output channel circuits, generate first clock edge information '10' or '0010' or transition direction information as current control information CON under a first condition where a data transition degree DATA_Δ is greater than a predetermined threshold value VT as a result of the comparison, and generate second clock edge information '01' or '0011' and the transition direction information as the current control information CON under a second condition where the data transition degree DATA_Δ is less than or equal to the threshold value VT as a result of the comparison (S1 to S5).

In the electroluminescent display apparatus, the timing controller may format the current control information CON into EPI transfer data and may transfer the EPI transfer format to a source driver IC (S6). The first clock edge information '10' or '0010' and the second clock edge information '01' or '0011', as in FIGS. 12 and 14, may be implemented as delimiter information having different logic values in an EPI transfer data format. The delimiter information may be located at a position previous to image data, and for example, may be implemented by 2 bits or 4 bits, but is not limited thereto. The transition direction information, as in FIG. 16, may include several-bit control bit information located at a last portion of each of R/G/B data bits of image data in the EPI transfer data format.

Referring to FIG. 11, in a liquid crystal display apparatus, a timing controller may compare $(N-1)^{th}$ (N being a natural number) line image data with Nth line image data by data output channel circuits, generate first clock edge information '10' or '0010' or a vertical polarity control signal as current control information CON under a first condition where a data transition degree DATA_Δ is greater than a predetermined threshold value VT as a result of the comparison, and generate second clock edge information '01' or '0011' and the vertical polarity control signal as the current control information CON under a second condition where the data transition degree DATA_Δ is less than or equal to the threshold value VT as a result of the comparison (S1 to S5).

In the liquid crystal display apparatus, the timing controller may format the current control information CON into EPI transfer data and may transfer the EPI transfer format to a source driver IC (S6). The first clock edge information '10' or '0010' and the second clock edge information '01' or '0011', as in FIGS. 12 and 14, may be implemented as delimiter information having different logic values in an EPI transfer data format. The delimiter information may be located at a position previous to image data, and for example, may be implemented by 2 bits or 4 bits, but is not limited thereto. The transition direction information, as in FIG. 16, may include several-bit control bit information located at a last portion of each of R/G/B data bits of image data in the EPI transfer data format.

Referring to FIG. 11, a source driver IC may receive EPI transfer data and may recover current control information CON in the EPI transfer data (S7).

Referring to FIG. 11, as in FIGS. 13 and 15, the source driver IC may selectively turn on additional switches in an output buffer on the basis of the first clock edge information '10' or '0010' and may turn on all of the additional switches in the output buffer on the basis of the second clock edge information '01' or '0011'.

The source driver IC may selectively turn on the additional switches of the output buffer on the basis of the transition direction information or the vertical polarity control signal. The source driver IC may turn on a first additional switch of the output buffer on the basis of transition direction information indicating upward transition or the vertical polarity control signal and may turn on a second additional switch of the output buffer on the basis of transition direction information indicating downward transition or the vertical polarity control signal.

Figures 17, 18:
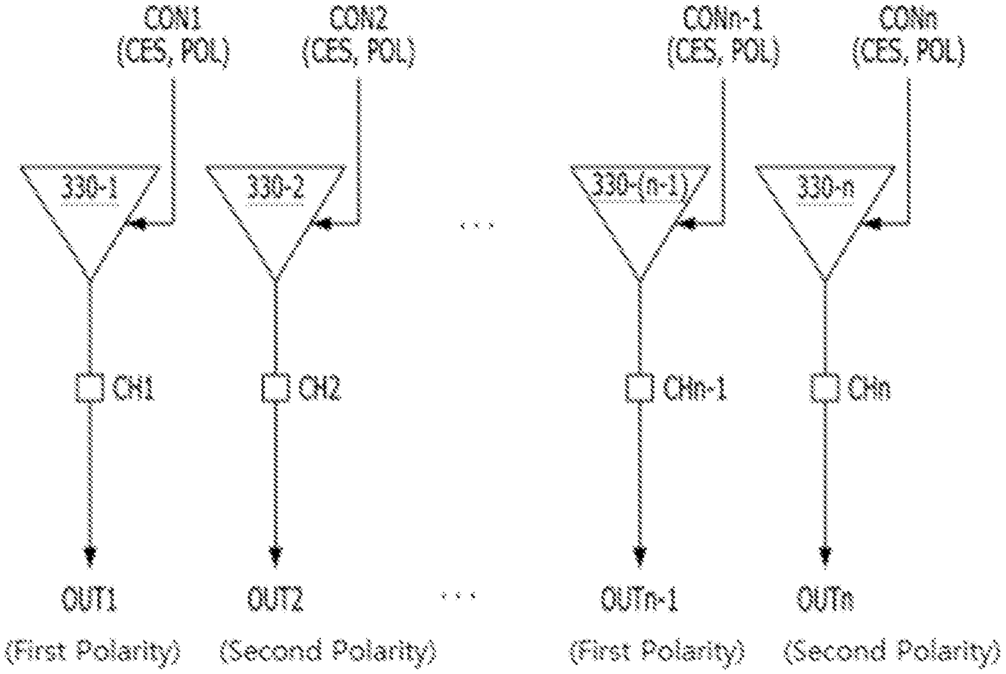
FIG. 17 is a diagram illustrating an example where current control information includes clock edge information and a vertical polarity control signal when a display apparatus is a liquid crystal display apparatus.
FIG. 18 is a diagram illustrating an on or off status of an additional current of each output channel based on a logic value of a vertical polarity control signal when clock edge information is first clock edge information.

FIG. 17 is a diagram illustrating an example where current control information includes clock edge information and a vertical polarity control signal when a display apparatus is a liquid crystal display apparatus. FIG. 18 is a diagram illustrating an on or off status of an additional current of each output channel based on a logic value of a vertical polarity control signal when clock edge information is first clock edge information. FIG. 19 is a diagram illustrating an on or off status of an additional current of each output channel based on a logic value of a vertical polarity control signal when clock edge information is second clock edge information.

Referring to FIG. 17, clock edge information CES and a vertical polarity control signal POL may correspond to in common a first output channel (for example, CH1) and a second output channel (for example, CH2) where different polarities (i.e., opposite polarities) are implemented in a liquid crystal display apparatus. In this case, an additional switch selectively turned on among a first additional switch for enabling an additional rising current and a second additional switch for enabling an additional falling current in output buffers 330-1 to **330-*n* may be opposite in the first output channel CH1 and the second output channel CH2**.

For example, as in FIG. 18, when first clock edge information '10' or '0010' and a vertical polarity control signal POL having a high logic value H correspond to the first output channel CH1 and the second output channel CH2, a first additional switch corresponding to the first output channel CH1 and a second additional switch corresponding to the second output channel CH2 may be turned on, and a second additional switch corresponding to the first output channel CH1 and a first additional switch corresponding to the second output channel CH2 may be turned off. In this case, an additional rising current may be enabled in the first output channel CH1, and an additional falling current may be enabled in the second output channel CH2.

Also, as in FIG. 18, when the first clock edge information '10' or '0010' and the vertical polarity control signal POL having a low logic value L correspond to the first output channel CH1 and the second output channel CH2, the second additional switch corresponding to the first output channel CH1 and the first additional switch corresponding to the second output channel CH2 may be turned on, and the first additional switch corresponding to the first output channel CH1 and the second additional switch corresponding to the second output channel CH2 may be turned off. In this case, the additional falling current may be enabled in the first output channel CH1, and the additional rising current may be enabled in the second output channel CH2.

Furthermore, as in FIG. 19, when second clock edge information '01' or '0011' corresponds to the first output channel CH1 and the second output channel CH2, all additional switches corresponding to the first output channel CH1 and the second output channel CH2 may be turned off regardless of the vertical polarity control signal POL. In this case, an additional current may not be enabled in the first output channel CH1 and the second output channel CH2.

Figure 21:
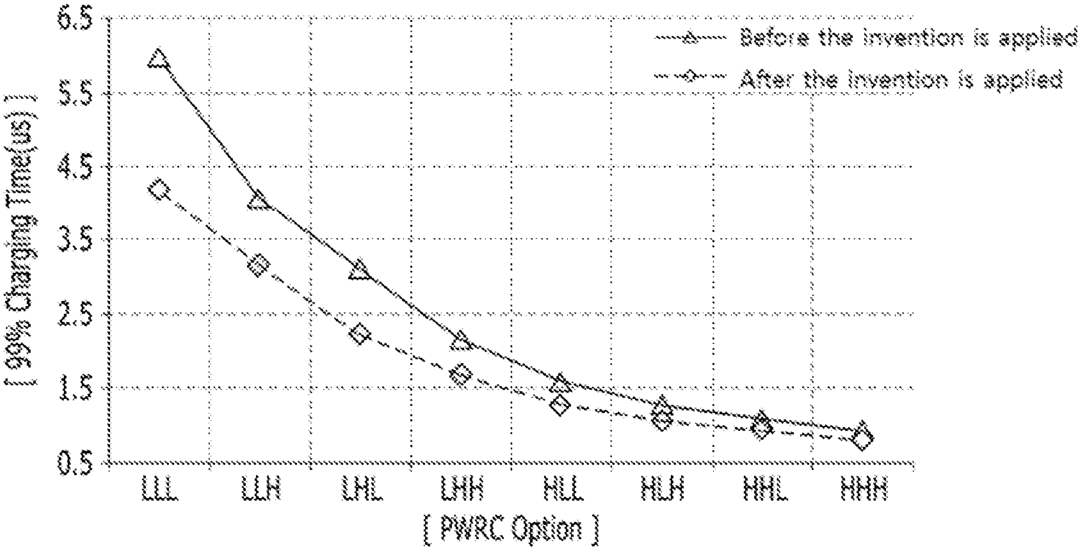

FIGS. 20 and 21 are diagrams illustrating a transition time decrease rate before and after the disclosure is applied, in each of a plurality of power control modes.

Referring to FIGS. 20 and 21, in the present aspect, an additional current source may be selectively enabled for only an output channel satisfying a worst transition condition where a data transition degree is greater than a threshold value, and thus, a transition time of a corresponding output channel may be reduced, thereby increasing an output slew rate of a target data voltage.

The aspects of the present disclosure may realize the following effects.

In the aspects of the present disclosure, an amplifier bias current Isum may be set based on a normal transition condition instead of a worst transition condition, and an additional current source may be selectively enabled for only an output channel which satisfies the worst transition condition, thereby enhancing all of a power consumption characteristic and a data charging/discharging characteristic.

In the aspects of the present disclosure, because an additional current source is selectively enabled for only an output channel where the degree of data transition is large, a dynamic current of a source driver IC may be reduced.

In the aspects of the present disclosure, an additional current source of an individual output buffer may be controlled by using a clock edge in an EPI protocol, and thus, an overhead for the EPI transfer data format may not occur.

The effects according to the present disclosure are not limited to the above examples, and other various effects may be included in the specification.

While the present disclosure has been particularly shown and described with reference to exemplary aspects thereof, it will be understood by those of ordinary skill in the art that various changes in form and details may be made therein without departing from the spirit and scope of the present disclosure as defined by the following claims.

What is claimed is:

1. A display apparatus comprising:

a display panel including a plurality of pixels;

a timing controller configured to generate current control information based on a degree of transition of image data which is to be applied to a corresponding pixel of the plurality of pixels; and a plurality of output buffers configured to output a target data voltage, corresponding to the image data, to data output channels connected to the plurality of pixels, wherein each of the output buffers comprises:

an amplifier output circuit configured to apply a rising current or a falling current, which is previously set for outputting the target data voltage, to an output node connected to one of the data output channels; and a slew rate adjustment circuit configured to selectively and further apply an additional rising current or an additional falling current to the output node on the basis of the current control information, for increasing an output slew rate of the target data voltage, wherein the additional rising current and the additional falling current are independent of an amplifier bias current, and wherein, at the output node, the additional rising current is added to the rising current and the additional falling current is added to the falling current.

2. The display apparatus of claim 1, wherein the amplifier output circuit comprises:

a pull-up transistor configured to source the rising current from a high level voltage source to the output node; and a pull-down transistor configured to sink the falling current from the output node to a low level voltage source.

3. The display apparatus of claim 2, wherein the slew rate adjustment circuit comprises:

a first additional current source configured to generate the additional rising current;

a first additional switch turned on or off based on the current control information to control a current flow between the first additional current source and the output node;

a second additional current source configured to generate the additional falling current; and a second additional switch turned on or off based on the current control information to control a current flow between the second additional current source and the output node.

4. The display apparatus of claim 3, wherein the first additional current source and the first additional switch are serially connected between the high level voltage source and the output node, and wherein the second additional current source and the second additional switch are serially connected between the output node and the low level voltage source.

5. The display apparatus of claim 3, wherein, while the first additional switch is being turned on, the pull-up transistor and the first additional current source are connected in parallel between the high level voltage source and the output node, and a total rising current, which is a sum of the rising current and the additional rising current, is applied to the output node.

6. The display apparatus of claim 3, wherein, while the second additional switch is being turned on, the pull-up transistor and the second additional current source are connected in parallel between the output node and the low level voltage source, and a total falling current, which is a sum of the falling current and the additional falling current, is applied to the output node.

7. The display apparatus of claim 3, wherein the first additional switch and the second additional switch are selectively turned on under a first condition where the degree of transition of the image data is greater than a threshold value, and all of the first additional switch and the second additional switch are turned off under a second condition where the degree of transition of the image data is less than or equal to the threshold value.

8. The display apparatus of claim 3, wherein the timing controller compares $(N-1)^{th}$ (N being a natural number) line image data with $N^{th}$ line image data by data output channel units, generates first clock edge information and transition direction information as the current control information under a first condition where a data transition degree is greater than a threshold value as a result of the comparison, and generates second clock edge information and the transition direction information as the current control information under a second condition where the data transition degree is less than or equal to the threshold value as a result of the comparison, and the first additional switch and the second additional switch are selectively turned on based on the first clock edge information and the transition direction information, and all of the first additional switch and the second additional switch are turned off based on the second clock edge information regardless of the transition direction information.

9. The display apparatus of claim 8, wherein the transition direction information comprises first status information indicating upward transition and second status information indicating downward transition, based on the first clock edge information and the first status information, the first additional switch is turned on and the second additional switch is turned off, and based on the first clock edge information and the second status information, the first additional switch is turned off and the second additional switch is turned on.

10. The display apparatus of claim 8, further comprising a source driver integrated circuit including the plurality of output buffers, wherein the timing controller transfers the current control information to the source driver integrated circuit through an embedded panel interface (EPI) transfer data format, and wherein the first clock edge information and the second clock edge information are implemented as delimiter information having different logic values in an EPI transfer format.

11. The display apparatus of claim 3, wherein the plurality of pixels are implemented as liquid crystal cells selectively implementing a first polarity and a second polarity, wherein the timing controller further generates a vertical polarity control signal for controlling polarities of the liquid crystal cells, wherein the timing controller compares $(N-1)^{th}$ (N being a natural number) line image data with Nth line image data by data output channel units, generates first clock edge information and the vertical polarity control signal as the current control information under a first condition where a data transition degree is greater than a threshold value as a result of the comparison, and generates second clock edge information and the vertical polarity control signal as the current control information under a second condition where the data transition degree is less than or equal to the threshold value as a result of the comparison, and the first additional switch and the second additional switch are selectively turned on based on the first clock edge information and the vertical polarity control signal, and all of the first additional switch and the second additional switch are turned off based on the second clock edge information regardless of the vertical polarity control signal.

12. The display apparatus of claim 11, wherein, when the first clock edge information and the vertical polarity control signal correspond to in common a first output channel and a second output channel where different polarities are implemented, an additional switch selectively turned on among the first additional switch and the second additional switch is opposite in the first output channel and the second output channel.

13. The display apparatus of claim 12, wherein, when the first clock edge information and the vertical polarity control signal having a high logic value correspond to the first output channel and the second output channel, the first additional switch corresponding to the first output channel and the second additional switch corresponding to the second output channel are turned on, and the second additional switch corresponding to the first output channel and the first additional switch corresponding to the second output channel are turned off.

14. The display apparatus of claim 12, wherein, when the first clock edge information and the vertical polarity control signal having a low logic value correspond to the first output channel and the second output channel, the second additional switch corresponding to the first output channel and the first additional switch corresponding to the second output channel are turned on, and the first additional switch corresponding to the first output channel and the second additional switch corresponding to the second output channel are turned off.

15. The display apparatus of claim 1, further comprising a main bias circuit configured to determine a level of the amplifier bias current based on a power control signal, wherein a level of the rising current and a level of the falling current are proportional to a level of the amplifier bias current.

16. A driving method of a display apparatus, comprising:

generating current control information based on a degree of transition of image data which is to be applied to pixels; and outputting a target data voltage, corresponding to the image data, to data output channels connected to the pixels, wherein the outputting of the target data voltage comprises:

applying a rising current or a falling current, which is previously set for outputting the target data voltage, to an output node connected to one of the data output channels; and selectively and further applying an additional rising current or an additional falling current to the output node on the basis of the current control information, for increasing an output slew rate of the target data voltage, wherein the additional rising current and the additional falling current are independent of an amplifier bias current, and wherein, at the output node, the additional rising current is added to the rising current and the additional falling current is added to the falling current.

* * * * *